//..//

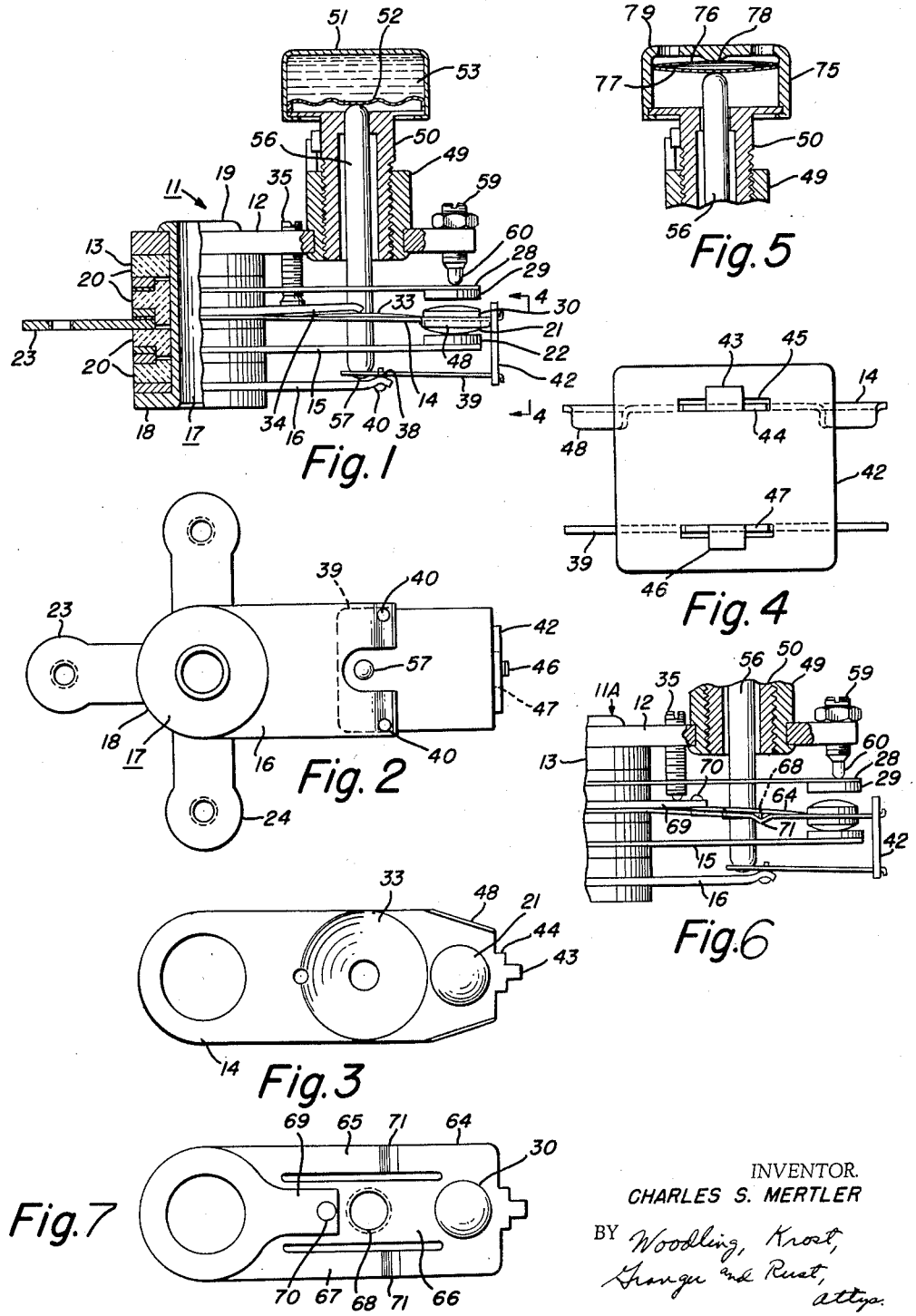

United States Patent Office 3,218,417
Patented Nov. 16, 1965

3,218,417
SNAP-ACTING THERMOSTAT WITH ADJUST-MENT AND THERMALLY RESPONSIVE MEANS IN SERIES
Charles S. Mertler, Mansfield, Ohio, assignor to Stevens Manufacturing Company, Inc., a corporation of Ohio
Filed Dec. 31, 1962, Ser. No. 248,688
14 Claims. (Cl. 200—138)

The invention relates in general to the snap-acting thermostats and more particularly to a snap-acting thermostat having a small temperature differential.

The invention may be incorporated in a thermostat which has a snap-acting contact blade carried on a base with first and second contacts mounted for mutual cooperation upon movement of the contact blade. Adjustment means is carried on the base and includes threaded means. Thermally responsive means is adjustably carried on the threaded means and includes a housing thereon with disc means in the housing. Means is provided to axially move a portion of the disc means upon changes in temperature and means connects said portion of said disc means to said contact blade to move same by both said adjustment means and temperature changes.

The thermostat of the present invention has a sufficiently narrow temperature differential that it may advantageously be used as a room temperature control thermostat. For satisfactory operation of a space heater for a room such a control thermostat should have an operating temperature differential of only one to two degrees Fahrenheit and the thermostat of the present invention may readily be constructed with this small temperature differential.

An object of the invention is to provide a snap-acting thermostat with a minimum of friction to obtain a small temperature differential.

Another object is to provide a thermostat wherein a temperature-responsive means is connected in series with an adjustment means to act on a movable contact blade.

Another object is to provide a thermostat with a snap-acting contact blade moved by linkage with minimum friction from thermally-responsive means in series with energy-storage means.

Another object is to provide a snap-acting thermostat in which thermally-responsive means and adjustment means are connected in series with energy-storage means, such as a resilient spring to actuate a contact blade.

Another object of the invention is to provide a snap-acting thermostat with a hermetically sealed housing mounted in an air stream to be controlled in temperature and with a temperature-responsive fluid within the sealed housing.

Another object is to provide a thermostat in which a lever is actuated by thermally-responsive means and wherein the lever is both a motion-amplifying lever and an energy-storage means.

Other objects and a fuller understanding of the invention may be had by referring to the following description and claims, taken in conjunction with the accompanying drawings, in which:

FIGURE 1 is a side elevational view partially in longitudinal section of a thermostat incorporating the invention;

FIGURE 2 is a bottom view of FIGURE 1;

FIGURE 3 is a bottom view of the snap-acting contact blade removed from the thermostat;

FIGURE 4 is an enlarged view on line 4—4 of FIGURE 1 with the contact blade 15 omitted;

FIGURE 5 is a partial view of a modification;

FIGURE 6 is a partial side elevational view of another modified form; and

FIGURE 7 is a top plan view of the contact blade 64 and deflecting blade 69 before assembly into the thermostat of FIGURE 6.

FIGURES 1 to 4 of the drawing show a thermostat 11 which is illustrative of one form of the invention. The thermostat 11 includes generally a base 12 on which a stack 13 is mounted. First and second contact blades 14 and 15, respectively, are carried in the stack 13 and a mounting blade 16 is also carried in the stack. The stack is formed by a hollow rivet 17 having a head 18 and a formed head 19 adjacent the base 12. A plurality of insulator washers 20 are used to separate the blades 14, 15 and 16 and to mutually insulate the contact blades 14 and 15 from each other and from the base 12. A first contact 21 is carried on the outboard end of the first contact blade 14 and a second contact 22 is carried on the outboard end of the second contact blade 15. Terminals 23 and 24 are provided in the stack 13 for external electrical connection to the first and second contact blades, respectively.

The thermostat 11 is shown as a single pole double throw thermostat and as such incorporates a third contact blade 28 carrying a third contact 29 for cooperation with a fourth contact 30 on the first contact blade 14. The fourth contact 30 is on the opposite side of this blade 14 from the first contact 21. The first and second contacts 21 and 22 cooperate with each other and the third and fourth contacts 29 and 30 cooperate with each other.

The first contact blade 14 is a snap-acting over center blade caused by a dished portion 33 as better seen in FIGURE 3. A deflecting blade 34 is carried in the stack 13 and the outboard end thereof is forked to act against the mid-portion 33 of the snap-acting first contact blade 14. An adjusting screw 35 is carried in the base 12 to adjustably move the deflecting blade 34 and thus adjust the snap-acting plane or position at which the blade 14 snaps over center.

The mounting blade 16 has a generally cylindrical convex surface 38 at the outboard end thereof to pivotally receive a lever 39. Pivot pins 40 are fixed in the outer end of the mounting blade 16 and are loosely received in apertures in the lever 39 to retain this lever in the thermostat. An insulating push link or operating link 42 of any suitable material, such as ceramic, is provided for connection between the outboard ends of the contact blade 14 and the lever 39. The FIGURE 3 shows the contact blade 14 as removed from the thermostat and shows that at the outboard end thereof there is an extending tongue 43 protruding from a shoulder 44. The shoulder 44 passes through an aperture 45 in the push link 42 and the tongue 43 is bent over to retain the push link on the contact blade 14. The width of the shoulder 44 closely approximates that of the aperture 45 to restrain the push link 42 in sidewise movement and the tongue 43 is bent over to loosely but closely and positively retain the push link 42 on the contact blade 14. The outer end of the lever 39 has a similar construction with a tongue 46 and shoulder 47 for connection of this lever 39 to the push link 42. The contact blade 14 may be provided with down-turned stiffening flanges 48 near the outer end thereof.

A nut 49 is fixed on the base 12 and threadably receives a screw 50. On the upper end of the screw is mounted a housing 51 which is shown as a hermetically sealed housing having a deflectable diaphragm 52 or disc means as one wall of the housing. The housing 51 contains a thermally-responsive fluid and these housings 51 are commercially available. The screw 50 is hollow and receives an insulating push pin 56 coaxially within the screw. One end of the push pin bears against the diaphragm 52 and the other end is received in a depressed socket 57 in the inboard end of the lever 39.

The housing 51 acts as a knob which may be manually grasped and rotated and this knob may carry indicia for indicating the rotational position thereof relative to the base 12.

The outboard end of the base 12 carries an adjusting screw 59 which has an insulating tip 60 bearing against the rear face of the third contact blade 28. The adjustment of this screw 59 adjusts the spacing between the contacts 21 and 22 in their open condition and also adjusts the temperature differential of operation of the thermostat 11.

The second contact blade 15 is relatively rigid to provide a limit for downward movement, as viewed in FIGURE 1, for the first contact 21. The adjusted position of the screw 59 provides an upward limit for movement of the contact 21. The mounting blade 16 is relatively rigid and the lever 39 is a resilient leaf spring.

*Operation*

The thermostat 11 is one which is quite sensitive to temperature changes and may be constructed to have a temperature differential of only one to two degrees F. between "off" and "on" conditions of the contacts 21 and 22.

FIGURE 1 shows the thermostat 11 in its normal condition, such as room temperature condition, wherein contacts 21 and 22 are normally closed. Upon temperature rise, the thermally-responsive fluid 53 expands to provide a downward axial force on the push pin 56. This provides a downward force on the inboard end of the lever 39 and thus this lever is thermally-actuated. This downward movement deflects this resilient spring lever 39, attempting to move the outboard end thereof upwardly. This upward force is resisted by the inherent snap-action characteristics of the contact blade 14 and by the mounting thereof including the deflecting blade 34. When the upward force acting through the push link 42 is sufficient, the snap-acting contact blade 14 will snap over center to the opposite limit position which means that the contacts 21 and 22 are now open and the contacts 29 and 30 are closed.

Thus, it will be seen that the lever 39 is an energy-storage means to store sufficient energy from the thermally-responsive fluid 53 until it can force the contact blade 14 to snap over center. Where the thermally-responsive fluid 53 is a liquid and hence relatively incompressible, it is then quite important that the lever 39 be resilient to be an energy-storage means. Where the thermally-responsive fluid 53 is a gas, then this gas, being compressible, may also act as an energy-storage means in addition to or to the exclusion of resiliency in the lever 39. Also, it will be noted that the lever 39 is a motion-amplifying lever with a ratio of about five to one because of the ratio of the lever arms on each side of the pivot line at the cylindrical surface 38.

The fact that the lever 39 has substantially a line contact on the cylindrical surface 38 provides a low friction during movement. Also the insulating push link 42 has substantially a line contact at both ends thereof, namely, at the connection to the lever 39 and at the connection to the contact blade 14. These line contacts minimize the friction to greatly aid in achieving the small temperature differential.

FIGURE 3 shows the contact blade 14 as removed from the thermostat 11. The dished portion 33 provides the snap-action of this contact blade and the actual snap-acting condition is modified by the fact that the midportion of the blade 14 is restrained downwardly by the deflecting blade 34 and the outboard end of the blade 14 is restrained upwardly by the relatively rigid contact blade 15. Thus, whereas the snap-acting contact blade 14, as removed from the thermostat 11, may require 11 ounces of force, for example, to cause it to snap over center, considerably less force is required when this contact blade 14 is restrained within the thermostat 11. The above defined restraint deflects the contact blade 14 from its unrestrained position so that only six ounces of upward force may be required on the push link 42 to cause this blade 14 to snap over center. The blade 14 snaps over center whenever the force thereon passes through zero, in other words, when the force from the push link 42 exceeds the internal bias of this snap-acting blade 14.

A downward return force is built into the contact blade 14 by the curvature of the dished portion 33 and this return force may be in the order of four ounces. Thus, when the upward urging force on the push link 42 is reduced to less than four ounces, the contact blade 14 will snap downwardly in return movement. Thus, only two ounces of differential force need be provided by expansion of the thermally-responsive fluid.

The action of the snap-acting blade 14 is similar to the operation of the bottom of an oil can. This is so formed as to have an initial bias outwardly and it tends to spring back to this outward position when snapped over center and the force subsequently removed. The low differential force permits operation of the thermostat with only one or two degrees differential temperature and in fact the differential temperature may be reduced to a fraction of a degree if the gap between the contact is reduced, as by adjusting the screw 59.

The threaded screw 50 provides a manual adjustment of the temperature at which the contacts will be actuated. The thermally-responsive means is the fluid 53 and since this is carried in the housing 51 on the screw 50, it is effectively in series with this manual adjustment. The lever 39 is flexible and thus stores energy from movement of the push pin 56 until sufficient force is available to actuate the blade 14. Thus, this energy-storage means is also in series with the manual adjustment means and the thermally-responsive means. The diaphragm 52 is a form of disc means which is axially moved in response to changes in temperature.

The FIGURE 5 shows a modification of a knob 75 which may be used to replace the housing 51. This knob 75 is a manually adjustable knob which may be rotated to roate the screw 50 and thus provide the adjustment feature of the operating temperature. The knob 75 is a form of a housing in which first and second bimetal discs 76 and 77 are carried. The two bimetal discs are mounted face-to-face in a series connection with just the rims thereof in mutual engagement. A projection 78 is provided centrally on the underside of the outer wall 79 of the knob 75. This projection 78 bears against the center of the bimetal disc 76 and acts against the insulating push pin 56. With temperature changes in a first direction, for example an increasing temperature, the bimetal discs 76 and 77 separate at the center to exert an axial pushing force on the push pin 56. For opposite temperature changes, the bimetal discs 76 and 77 will move together for the opposite effect. One bimetal disc 76 may be used instead of two, although with less temperature sensitivity. Conversely, more than two bimetal discs stacked in series may be used to increase the temperature sensitivity. Thus, it will be seen that the knob 75 may be substituted for the housing 51 as the thermally-responsive means of the thermostat.

The bimetal discs 76 are disc means which are capable of movement in response to temperature changes. In this sense, they are similar to the disc means of the diaphragm 52 which is also axially movable in response to temperature changes. In both FIGURES 1 and 5 it will be noticed that the knob 51 or 75 may easily be mounted in the stream of air the temperature of which may be controlled. Accordingly, good heat transfer to the temperature-responsive material within the manually adjustable knob is assured.

The thermostats of the invention provide the combination of a manually adjustable knob which also incorporates thermally-responsive means mounted on the threadably adjustable means and both the manual adjustment means and the temperature-responsive means act on the contact blade 14. This permits actuation of this snap-acting contact blade 14 with the blade 14 having a clearly defined snap plane through which the blade 14 snaps from one position to the alternate position. This snap plane is adjusted primarily by the adjusting screw 35 and the contact gap is adjusted by the adjusting screw 59 and the position of the second contact blade 15. With a larger gap in the order of .010 inch, the thermostat may have a two to four degree differential in temperature and will operate at 240 volts and 25 amperes. Smaller contact gaps permit even smaller temperature differentials down to a fraction of a degree Fahrenheit. The design of the thermostat permits maintaining the snap plane constant despite adjustments in operating temperature and this again achieves a construction where only a low operating force is required and this force is constant throughout the operating temperature range.

FIGURES 6 and 7 show another modification of the invention as embodied in a thermostat 11A. This thermostat 11A is similar to the thermostat 11 except that it embodies a snap-acting contact blade 64 instead of the contact blade 14. This contact blade 64 is better shown in FIGURE 6, as removed from the thermostat. The outboard end of the contact blade 64 carries the first contact 21. The contact blade 64 is a three-legged blade having first, second and third legs 65, 66 and 67. A flanged hole 68 is provided in the middle leg 66 for passage of the insulating push pin 56. A deflecting blade 69 is carried in the stack 13 and may be fixed to the middle leg 66 as by the rivet 70. The adjusting screw 35 bears against this deflecting blade 69. V-crimps 71 are provided in the outer legs 65 and 67 to shorten these legs and thus make the contact blade 64 a snap-acting over-center blade. During manufacture, the snap-acting contact blade 64 may be bent to have a downward curvature at the outer end carrying the contact 21. This blade may then be normalized to relieve stresses and so that it will tend to return to this initial downward bias. Next, the V-crimps 71 may be put in the outer legs 65 and 67 to make this a snap-acting blade but one which tends to return to the first or downward position upon being snapped upwardly through a snap plane to a second position. This thermostat 11A with the contact blade 64 will operate in essentially the same manner as thermostat 11 of FIGURES 1 to 4.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostat comprising in combination, a base,
a contact blade carried on said base,
first and second contacts mounted relative to said base for mutual cooperation upon movement of said contact blade,
adjustment means carried on said base,
said adjustment means including threaded means,
a housing on said threaded means,
disc means in said housing,
means to axially move a portion of said disc means upon changes in temperature,
and means connecting said portion of said disc means to said contact blade to move same by either said adjustment means or said temperature changes.

2. A thermostat comprising in combination, a base,
a snap-acting over-center contact blade carried on said base,
first and second contacts mounted relative to said base for mutual cooperation upon movement of said contact blade,
adjustment means carried on said base,
said adjustment means including threaded means,
a housing on said threaded means,
disc means in said housing,
a thermally-responsive fluid in said housing to axially move a portion of said disc means upon changes in temperature,
a motion-amplifying lever having a portion pivotally mounted relative to said base,
means connecting said portion of said disc means through said lever to said contact blade,
and one of said thermally-responsive fluid and said lever being energy-storage means to store energy from temperature changes to establish sufficient force to snap said contact blade over-center to a different contact condition.

3. A thermostat comprising in combination, a base,
a snap acting contact blade carried on said base,
first and second contacts mounted relative to said base for mutual cooperation upon movement of said contact blade,
adjustment means and thermally responsive means connected in series with energy-storage means between said base and said snap-acting contact blade,
said adjustment means including threaded means,
said thermally responsive means including a housing on said threaded means,
disc means in said housing,
and means to axially move said disc means upon changes in temperature.

4. A thermostat comprising in combination, a base,
a snap acting contact blade carried on said base,
first and second contacts mounted relative to said base for mutual cooperation upon movement of said contact blade,
an insulating push link loosely but closely and positively connected to one end of said contact blade,
adjustment means and thermally responsive means connected in series between said base and the opposite end of said push link,
said adjustment means including threaded means,
said thermally responsive means including a housing having a disc member and means to axially move said disc member in response to temperature changes,
and a push pin coaxial with said threaded means and acting between said disc means and the opposite end of said insulating push link.

5. A thermostat comprising in combination, a base,
a snap acting contact blade carried on said base,
first and second contacts mounted relative to said base for mutual cooperation upon movement of said contact blade,
a screw threaded in said base,
a housing on said screw and incorporating a disc member,
means to axially move said disc member in response to temperature changes,
a motion amplifying lever having a portion pivotally mounted relative to said base,
an insulating push pin coaxially within said screw and acting between said disc member and a portion of said lever,
and linkage means between said lever and said snap-acting contact blade.

6. A thermostat comprising in combination, a base,
a snap-acting contact blade carried on said base,
first and second contacts mounted relative to said base for mutual cooperation upon movement of said contact blade,
a resilient lever pivotally mounted relative to said base,
an insulating push link loosely interconnecting one end of said contact blade and one end of said lever,
adjustment means and thermally responsive means connected in series between said base and the opposite end of said lever,
said adjustment means including threaded means,
said thermally responsive means including a sealed housing having a hermetically sealed diaphragm and containing a temperature responsive fluid, and a push pin coaxial with said threaded means and acting between said diaphragm and said opposite end of said lever.

7. A thermostat comprising in combination, a base, a snap-acting contact blade carried on said base, first and second contacts mounted relative to said base for mutual cooperation upon movement of said contact blade, a screw threaded in said base, a hermetically sealed housing on said screw and incorporating a diaphragm, a temperature responsive fluid within said sealed housing and acting on said diaphragm, a thermally actuated lever having a portion pivotally mounted relative to said base, an insulating push pin coaxially within said screw and acting between said diaphragm and a portion of said thermally actuated lever, and linkage means between said lever and said snap-acting contact blade.

8. A thermostat comprising in combination, a base, a contact blade and a mounting blade carried on said base, said contact blade being a snap-acting over center blade, first and second contacts mounted relative to said base for mutual cooperation upon movement of said contact blade, a resilient energy-storing lever having a lengthwise mid-portion pivotally mounted on the outboard end of said mounting blade, an insulating push link loosely but closely and positively connecting the outboard ends of said contact blade and said lever, a sealed housing carried on said base and incorporating a hermetically sealed diaphragm, a temperature responsive fluid within said sealed housing and acting on said diaphragm, and a push pin acting between said diaphragm and the inboard end of said lever to cause said snap-acting contact blade to snap over center upon temperature changes.

9. A thermostat comprising in combination, a base, a contact blade and a mounting blade carried on said base, said contact blade being a snap-acting over-center blade, first and second contacts mounted relative to said base for mutual cooperation upon movement of said contact blade, a lever having a portion pivotally mounted on the outboard end of said mounting blade, means connecting the outboard end of said contact blade and a portion of said lever, a housing carried on said base and incorporating a bimetallic disc, and a link acting between said bimetallic disc and another portion of said lever to cause said snap-acting contact blade to snap over center upon temperature changes.

10. A thermostat comprising in combination, a base, a snap acting contact blade carried on said base, a first contact mounted on the outboard end of said contact blade, a second contact mounted relative to said base for cooperation with said first contact, a screw threaded in said base, a hermetically sealed housing on said screw and incorporating a diaphragm, a temperature responsive fluid within said sealed housing and acting on said diaphragm, a thermally actuated resilient lever having a portion pivotally mounted relative to said base, an insulating push pin coaxially within said screw and acting between said diaphragm and a portion of said thermally actuated lever, an insulating push link loosely but closely and positively connecting an end of said lever and the outboard end of said contact blade, and temperature changes on said sealed housing affecting the volume of said fluid to act through said push pin and said lever to move said push link to cause said snap-acting contact blade to snap over center.

11. A thermostat comprising in combination, a base, a contact blade and a mounting blade carried on said base, first and second contacts mounted on the outboard end of said contact blade and mounted relative to said base, respectively, for mutual cooperation, said contact blade being a snap-acting over center blade, a thermally actuated lever having a mid-portion pivotally mounted on the outboard end of said mounting blade, said lever extending substantially parallel to said snap-acting blade and having an outboard end, an insulating push link loosely but closely and positively connecting the outboard ends of said contact blade and said lever and generally perpendicular to each, a sealed housing carried on said base and incorporating a hermetically sealed diaphragm, a temperature responsive fluid within said sealed housing and acting on said diaphragm, and an insulating push pin acting between said diaphragm and the inboard end of said thermally actuated lever to cause said snap-acting contact blade to snap over center upon temperature changes.

12. A room temperature thermostat comprising, in combination, a base, first and second contact blades and a mounting blade carried on said base, first and second contacts mounted on said first and second contact blades, repsectively, for mutual cooperation, said first contact blade being a snap-acting over center blade, said second contact blade being relatively rigid, a thermally actuated lever having a mid-portion pivotally mounted on the outboard end of said mounting blade, said lever extending substantially parallel to said snap acting blade and having an outboard end, an insulating push link loosely but closely and positively connecting the outboard ends of said first contact blade and said lever, a sealed housing carried on said base and incorporating a hermetically sealed diaphragm, a temperature responsive fluid within said sealed housing and acting on said diaphragm, and an insulating push pin acting between said diaphragm and the inboard end of said thermally actuated lever to cause said snap acting first contact blade to snap over center upon temperature changes.

13. A room temperature thermostat comprising, in combination, a base, a stack carried on said base, first and second contact blades and a mounting blade carried in that order relative to said base in said stack, first and second contacts mounted on the outboard ends of said first and second contact blades, respectively, for mutual cooperation, said first contact blade being a snap acting over center blade, said second contact blade being relatively rigid, means to adjust the snap acting condition of said first contact blade,
a thermally actuated lever having a mid-portion pivotally mounted on the outboard end of said mounting blade,
said lever extending substantially parallel to said snap-acting blade and having an outboard end,
an insulating push link loosely but closely and positively connecting the outboard ends of said first contact blade and said lever,
a nut mounted on said base,
a screw threaded in said nut,
a sealed housing on said screw and incorporating a hermetically sealed diaphragm,
a temperature responsive fluid within said sealed housing and acting on said diaphragm,
an insulating push pin coaxially within said screw and acting between said diaphragm and the inboard end of said thermally actuated lever,
and temperature changes on said sealed housing affecting the volume of said fluid to act through said push pin and said lever to move said push link to cause said snap-acting first contact blade to snap over center.

14. A room temperature thermostat comprising in combination, a base,
a stack carried on said base,
first and second contact blades and a mounting blade carried in that order relative to said base in said stack,
first and second contacts mounted on the outboard ends of said first and second contact blades, respectively, for mutual cooperation,
said first contact blade being a snap acting over center blade,
said second contact blade being relatively rigid,
a deflecting blade carried in said stack to act on said snap-acting first contact blade,
means to adjust said deflecting blade to adjust the snap acting condition of said first contact blade,
a thermally actuated lever having a mid-portion pivotally mounted on the outboard end of said mounting blade,
said lever extending substantially parallel to said snap acting blade and having an outboard end,
an insulating push link loosely but closely and positively connecting the outboard ends of said first contact blade and said lever,
a nut mounted on said base,
a screw threaded in said nut,
a sealed housing on said screw and incorporating a hermetically sealed diaphragm,
a temperature responsive fluid within said sealed housing and acting on said diaphragm,
an insulating push pin coaxially within said screw and acting between said diaphragm and the inboard end of said thermally actuated lever,
and an adjustment screw carried in said base and acting on the outboard end of said first contact blade on the side opposite said first contact,
temperature changes on said sealed housing affecting the volume of said fluid to act through said push pin and said lever to move said push link to cause said snap acting first contact blade to snap over center.

References Cited by the Examiner
UNITED STATES PATENTS

| | | | |
|---|---|---|---|
| 1,661,348 | 3/1928 | Grundman | 200—140 |
| 1,894,842 | 1/1933 | Appelberg | 200—138 |
| 2,689,290 | 9/1954 | Mertler | 200—138 |
| 2,824,193 | 2/1958 | Rosen et al. | 200—138 |
| 3,004,124 | 10/1961 | Huffman | 200—138 |

BERNARD A. GILHEANY, *Primary Examiner.*